M. D. KOENIG & J. H. WEICHEL.
PAN CLEANING AND GREASING MACHINE.
APPLICATION FILED APR. 18, 1918.
1,295,762.
Patented Feb. 25, 1919.
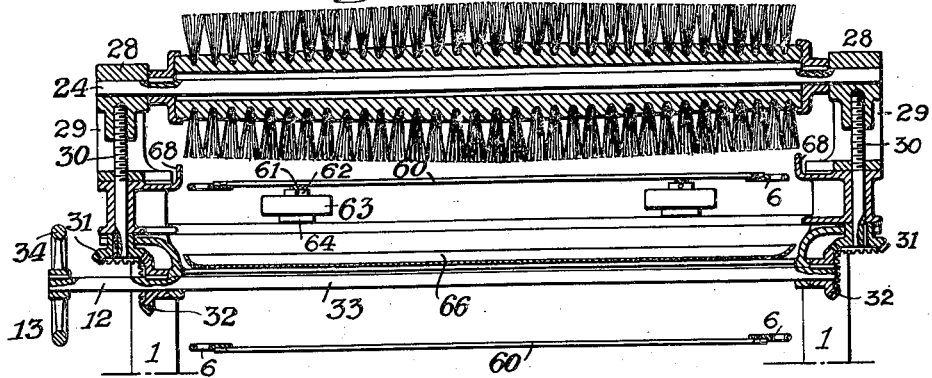
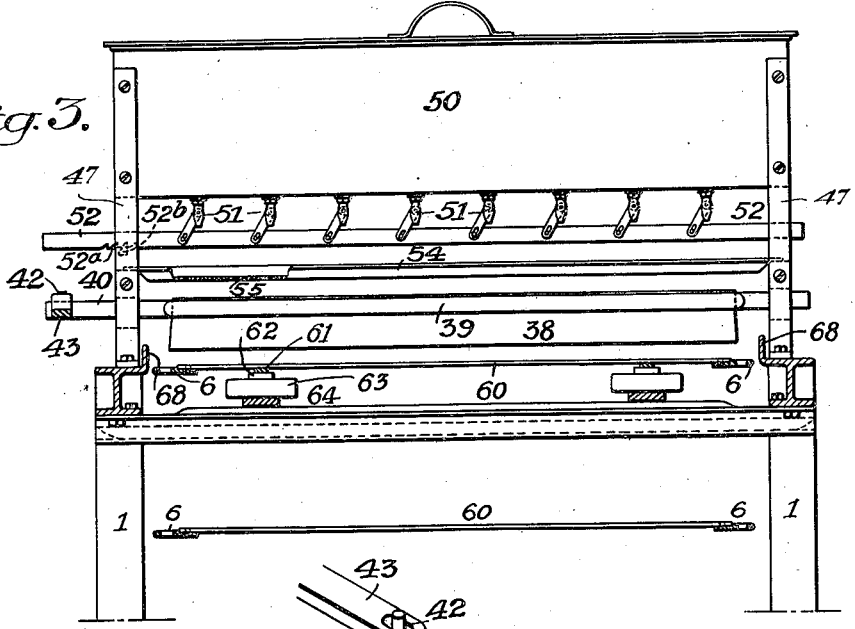
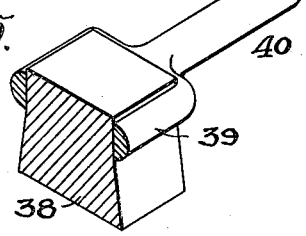
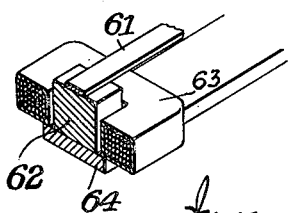
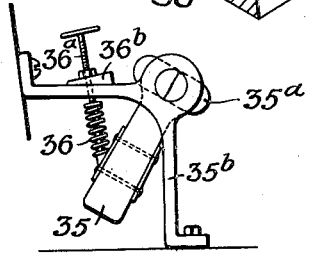

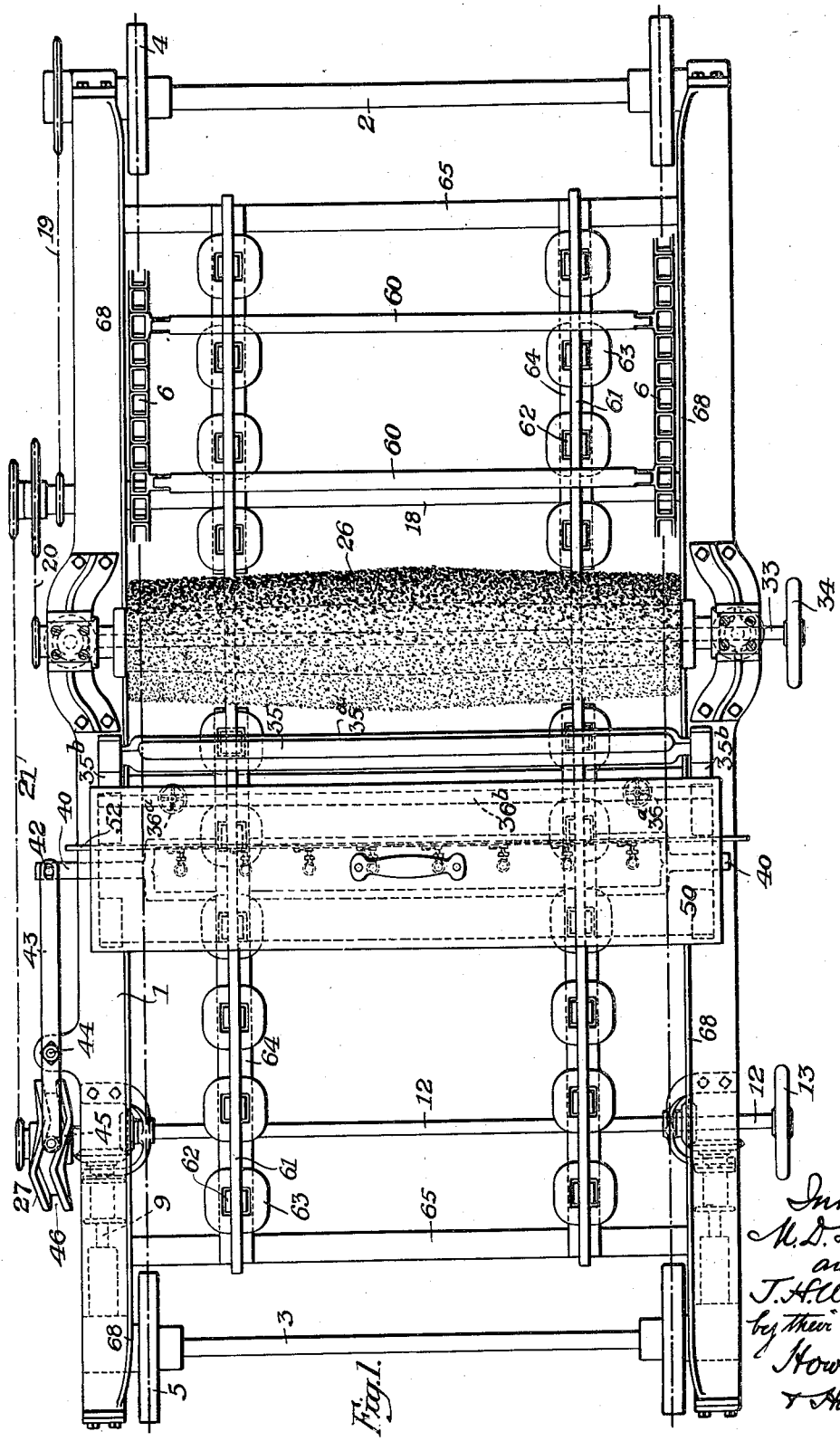

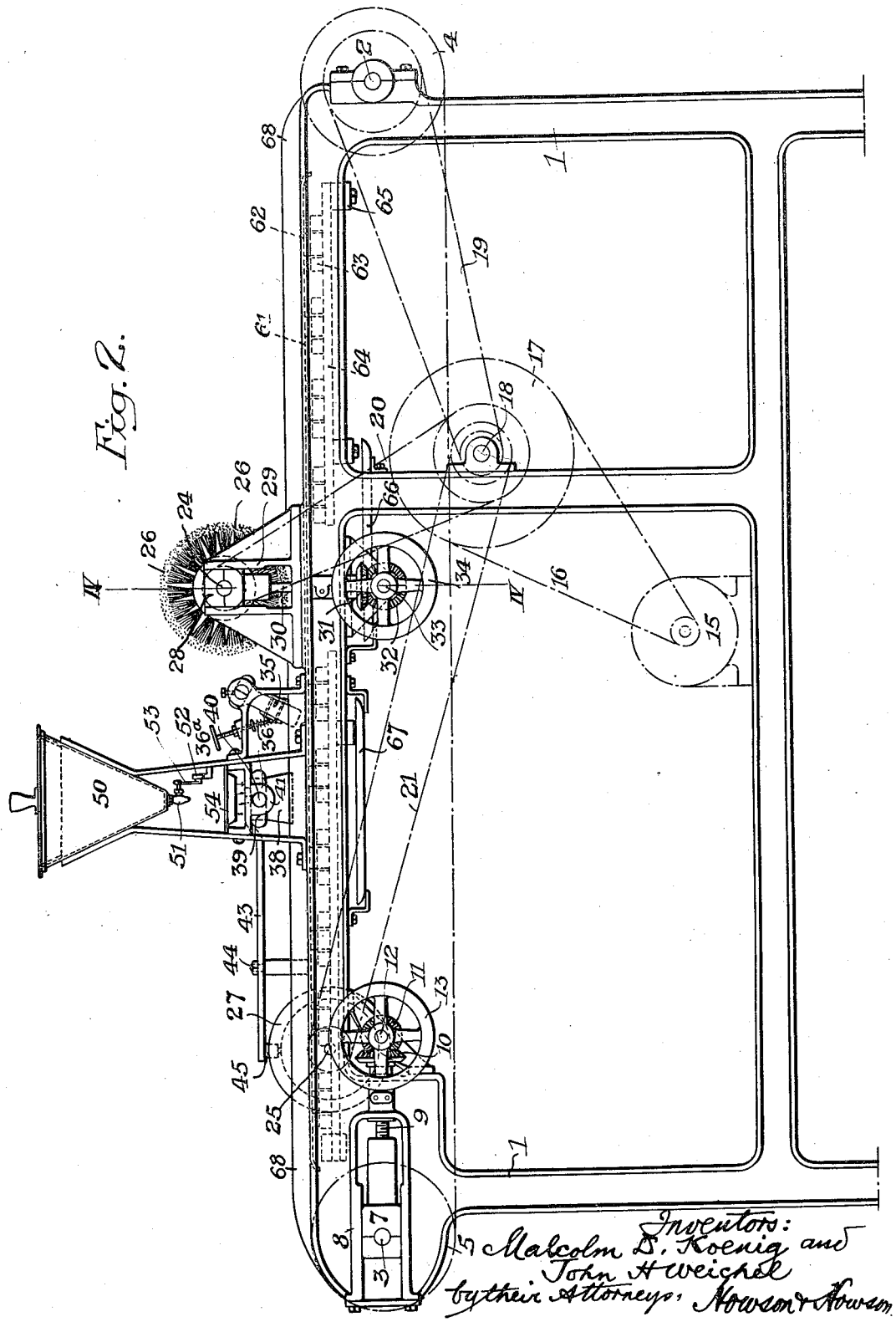

UNITED STATES PATENT OFFICE.

MALCOLM D. KOENIG AND JOHN H. WEICHEL, OF LANCASTER, PENNSYLVANIA, ASSIGNORS TO EDWIN C. FEIGENSPAN, OF NEWARK, NEW JERSEY.

PAN CLEANING AND GREASING MACHINE.

1,295,762.                Specification of Letters Patent.        Patented Feb. 25, 1919.

Application filed April 18, 1918. Serial No. 229,412.

*To all whom it may concern:*

Be it known that we, MALCOLM D. KOENIG and JOHN H. WEICHEL, citizens of the United States, residing in Lancaster, Lancaster county, Pennsylvania, have invented certain Improvements in Pan Cleaning and Greasing Machines, of which the following is a specification.

Our invention relates to machines for cleaning and greasing pans, such as are used by bakers for baking bread and other articles of food, and it comprises an apparatus designed to clean the pans preparatory to greasing the same, and then to completely cover the surface of each pan with the desired quantity of grease in a highly efficient manner.

A further object of our invention is to provide special means for feeding the pans and holding them sufficiently rigid against the action of the operating elements or members, which may comprise a cleaning brush, a cleaning pad, and a grease applicator, so that the cleaning operation and the greasing operation can be carried on continuously while the pans are moving continuously beneath such brush and the pads.

A further object of our invention is to provide a self-contained machine, motor driven; the motor supplying the necessary current for energizing magnets whereby the pans may be magnetically held to a series of conveyer slats, and at the same time actuating all of the moving parts of the apparatus.

These and other features of our invention are more fully described hereinafter, reference being had to the accompanying drawings, in which:

Figure 1, is a plan view of pan cleaning and greasing apparatus constructed in accordance with our invention.

Fig. 2, is a side elevation of the apparatus.

Fig. 3 is an end elevation.

Fig. 4, is a cross sectional view on the line IV—IV, Fig. 2, and

Figs. 5, 6 and 7, are views illustrating details of our invention.

In the drawings, 1, 1, represent a pair of suitable side frames carrying suitable supporting means for shafts 2 and 3, having sprocket wheels 4 and 5, respectively, over which conveyer chains 6 may pass. The shaft 3 is mounted in movable boxes 7 adapted to slideways 8 in the side frames, and screws 9 are provided whereby these boxes may be moved to shift the position of shaft 3 and sprocket wheels 5, so as to take up any slack in the chains; such screws being provided with bevel gears 10, driven by bevel gears 11, on a shaft 12, which may be operated by a hand wheel 13.

A motor generator is indicated at 15, which may be belted by a chain indicated at 16 of the silent drive type to a gear wheel indicated at 17, carried by a jack-shaft 18, from which shaft power is delivered by means of chains 19, 20 and 21, to shafts 2, 24 and 25. The shaft 2 moves the chains 6; the shaft 24 carries a cleaning brush 26 which is rotated by the chain 20, and the shaft or arbor 25 carries a cam 27, for a purpose to be described. The shaft 24 may be mounted in journals 28, disposed in vertical guideways 29 carried by the side frames, and these journals may be provided with screws 30 so as to be raised and lowered in their bearings; such screws having bevel pinions 31, meshing with bevel pinions 32, on a shaft 33, which may be operated by a hand wheel 34.

The cleaning brush 26 is preferably of the shape shown, being larger in the center and tapering toward the ends so as to readily operate upon all of the pans passed beneath the same; some of which may have become misshapen during use which tends to deepen the pans in the center. As the pans leave the cleaning brush, they are engaged by a dauber in the form of a felt strip 35 carried by a frame 35ª extending across the machine and journaled in brackets 35ᵇ; such frame being yieldingly supported by springs 36 operatively connected in the manner illustrated in Fig. 7, with tension rods 36ª mounted in a bar 36ᵇ extending across the machine and supported by the brackets 35ᵇ. By this arrangement the dauber can yield in its contact with the pans, and it is designed to wipe out and completely remove any crumbs, dirt or greate missed by the brush 26.

As the pans are fed forward, they come in contact with a greasing pad 38, comprising a felt strip mounted in a suitable frame 39 and arranged to be reciprocated laterally with respect to the movement of the pans. For this purpose, the frame 39 is provided at its ends with trunnions 40 adapted to suitable bearing blocks 41 at the sides of the machine; the trunnion at one end extending beyond the side frame and being connected at 42, to a lever 43, pivoted at 44, and having its opposite end provided with a roller 45 in engagement with the groove 46 of the cam 27, whereby the desired lateral movement may be imparted to said greasing pad 38.

Supported by suitable legs or standards 47 and disposed above the greasing pad 38, is a receptacle 50 for a suitable greasing medium, having at its bottom a plurality of faucets or pet cocks 51, through which the grease may be delivered to the greasing pad or member 38; such faucets or pet cocks being controlled by a single bar or lever 52 connected to the handles 53 of the same. To regulate the extent of opening of said faucets or pet cocks, the bar 52 may be notched at 52ª for engagement with a retaining lug 52ᵇ carried by one of the legs 47. Preferably a pan 54, having its bottom perforated as indicated at 55, is interposed between the faucets or pet cocks and the greasing pad so that the grease may be better distributed to the latter. In operation, the grease soaks through the felt pad 38 so that the under side of the same is provided with a constant supply sufficient to grease the pans passing beneath the same.

For the purpose of conveying the pans beneath the cleaning brush and pad, and the greasing member, magnetic bars 60 are carried by the chains 6, and these bars lie upon and move in contact with rails 61 in engagement with the cores 62 of rows of magnets 63 connected in series and suitably supported by longitudinal members 64 mounted on suitable cross pieces 65 carried by the side frames.

Suitable connections (not shown) between the motor generator indicated at 15 and the magnets insure the energization of the latter, and they in turn temporarily magnetize the cross bars 60 carried by the chains 6, so that metal pans laid on said cross bars will be magnetically held thereto and carried through the machine into contact with the cleaning brush, the cleaning pad, and the greasing member. When they reach the opposite end of the machine, they can be readily removed, and are in completely greased condition. The magnets are discontinued beneath the cleaning brush so that any dirt, crumbs and grease lifted by the brush and dropped over the rear edges of the pans may fall clear of the same, and a drip pan 66 may be placed beneath the frame to catch the same. A drip pan 67 may also be placed beneath the greasing member to catch any drippings.

If desired the tops of the side frames may be provided with guide flanges or rails 68, to insure passage of the pans in a relatively straight line through the machine.

It will be understood, of course, that changes may be made in the various details of construction, and that while definite embodiments of our invention have been shown in the accompanying drawings, it is to be understood that the same are susceptible of modification in various particulars without departing from the spirit or scope of the invention or sacrificing any of its advantages.

We claim:

1. In a pan cleaning machine, a frame, a vertically adjustable brush, movable bearings carried by the frame for vertical adjustment of said brush, means for raising and lowering said bearings, means for rotating the brush, a conveyer having magnetic means for passing pans beneath said brush, and means for driving said conveyer.

2. In a pan cleaning machine, a frame, a vertically adjustable brush, movable bearings carried by the frame for vertical adjustment of said brush, means for raising and lowering said bearings, means for rotating the brush, a conveyer having magnetic means for passing pans beneath said brush, and means for driving said conveyer by the same means which magnetically energize the same.

3. In a pan cleaning machine, a frame, a rotatable brush, movable bearings carried by the frame for vertically adjusting the axis of rotation of said brush, means for raising and lowering said bearings, means for driving the brush, and a magnetized conveyer for passing pans beneath said brush.

4. In a pan cleaning machine, the combination of a frame, a rotatable brush carried by said frame, a conveyer, means for driving the same, and magnetic flights carried by said conveyer for positively moving pans beneath and in contact with said brush.

5. In a pan cleaning machine, the combination of a frame, a rotatable brush adjustably carried by said frame, a conveyer, means for driving the same, and magnetic flights carried by said conveyer for positively moving metal pans beneath said brush.

6. The combination, in a pan cleaning and greasing machine, of a frame, an adjustable pan cleaning brush carried thereby, a wiper for acting upon the surface of the pans, a greasing member for engaging the upper surface of the pans, and a magnetic conveyer for moving the pans beneath the brush, wiper and greasing member.

7. The combination, in a pan cleaning and greasing machine, of a frame, an adjustable cleaning brush carried thereby, a wiper for acting upon the surface of the pans after leaving the brush, a greasing member for engaging the upper surface of the pans, a conveyer, means for driving the same, and magnetic flights carried by said conveyer whereby metal pans can be held thereto and positively conveyed beneath the brush, wiper and greasing member.

8. In a structure such as set forth in claim 1, a member for greasing the pans comprising a pad laterally movable with respect to the longitudinal movement of said pans.

9. In a structure such as set forth in claim 1, a member for greasing the pans after they leave the cleaning brush, and means for laterally moving said greasing member with respect to the longitudinal movement of said pans.

10. In a structure such as set forth in claim 1, a member for greasing the pans, and means for laterally moving said member with respect to the longitudinal movement of said pans, comprising a cam, and a bar pivoted to the frame of the machine and transmitting the movement of the cam to said greasing member; one end of said bar being connected to the greasing member and the opposite end being in operative engagement with the cam.

11. In a structure such as set forth in claim 1, a member for greasing the pans after they leave the cleaning brush comprising a greasing pad and a frame carrying the same, and means for laterally moving said pad-carrying frame with respect to the longitudinal movement of said pans, comprising a rotating cam, and a pivoted bar; one end of said bar being in operative engagement with the cam while its opposite end is pivotally connected to one end of the pad-carrying frame.

12. In a pan cleaning and greasing machine, a greasing member comprising a body of felt, a frame carrying the same, means for effecting movement of said member laterally with respect to the movement of the pans, and a conveyer for moving the pans beneath the laterally moving greasing member.

13. In a pan cleaning and greasing machine, a greasing member comprising a body of felt, a frame carrying the same, means for effecting movement of said member laterally with respect to the movement of the pans, a conveyer for moving the pans beneath the laterally moving greasing member, a grease receptacle mounted above said greasing member, and means for delivering grease therefrom to the greasing member.

14. In a pan cleaning and greasing machine, a greasing member comprising a body of felt suitably mounted under which the pans are arranged to pass, a grease receptacle mounted above the greasing member, controllable means for delivering grease therefrom, and a perforated pan forming a distributer interposed between the grease delivery and the felt greasing member.

15. In a pan cleaning and greasing machine, a greasing member comprising a body of felt suitably mounted under which the pans are arranged to pass, a frame carrying the same, means for effecting lateral movement of said greasing member with respect to the moving pans, a grease receptacle mounted above the greasing member, and adjustable means for delivering grease therefrom to the greasing member.

16. In a pan cleaning and greasing machine, the combination with a cleaning brush and a greasing member, of a metal pan conveyer having a plurality of flights upon which the pans are laid, and means for magnetizing said flights whereby the pans may be moved thereby beneath the cleaning brush and greasing member.

17. In a pan cleaning and greasing machine, the combination with a cleaning brush and a greasing member, of a metal pan conveyer having a plurality of flights, a plurality of magnets, and a bar interposed between the magnets and the flights over which said flights pass in contact whereby the latter are magnetized and serve to hold the pans in positive engagement with the brush and greasing member.

18. The combination, in a pan greasing and cleaning machine, of a cleaning brush, a shaft therefor, slideways carried by the frame, adjustable boxes in which the brush shaft is mounted carried by said slideways, and means for raising and lowering said slideways simultaneously to bring the brush in proper adjustment with respect to the pans; said brush having a contour tapering from the center toward the ends whereby proper engagement with mutilated pans is insured.

19. The combination, in a pan cleaning and greasing machine, of a cleaning brush, a greasing member, supporting means for said greasing member, a cam, means for driving the cam, and a connection between said greasing member and the cam whereby the greasing member may be moved laterally with respect to the moving pans.

20. The combination, in a pan cleaning and greasing machine, of a greasing pad, a frame carrying the same and having end trunnions, supports for said trunnions, a cam, means for driving the cam, and a pivotally mounted connection between one of the trunnions of the pad-carrying frame and said cam whereby the greasing member may be moved laterally with respect to the longitudinal movement of the pans.

21. In a pan cleaning machine, a wiping or daubing member comprising a body of felt, a pivotally mounted frame carrying the same, means for holding said wiping or daubing member in wiping position and permitting it to yield in the direction of movement of a pan when the latter is brought into contact therewith, and a conveyer for moving pans beneath said wiping or daubing member.

22. In a pan cleaning machine, a wiping or daubing member comprising a body of felt, a pivotally mounted frame carrying the same, spring tension means for holding said wiping or daubing member in wiping position and permitting it to yield in the direction of movement of a pan when the latter is brought into contact therewith, means for adjusting the tension of said spring means, and a conveyer for moving pans beneath said wiping or daubing member.

MALCOLM D. KOENIG.
JOHN H. WEICHEL.